(12) United States Patent
Chen

(10) Patent No.: US 8,157,274 B2
(45) Date of Patent: Apr. 17, 2012

(54) TORSIONALLY FLEXIBLE CONNECTING STRUCTURE FOR TRANSPORTATION DEVICE

(76) Inventor: Shane Chen, Camas, WA (US)

( * ) Notice: Subject to any disclaimer, the term of this patent is extended or adjusted under 35 U.S.C. 154(b) by 291 days.

(21) Appl. No.: 12/349,426

(22) Filed: Jan. 6, 2009

(65) Prior Publication Data

US 2010/0171298 A1    Jul. 8, 2010

(51) Int. Cl.
*B62M 1/00* (2010.01)
(52) U.S. Cl. ............................ 280/87.041; 280/87.01
(58) Field of Classification Search ............ 280/87.01, 280/87.021, 87.03, 87.041, 87.043, 11.221, 280/11.25
See application file for complete search history.

(56) References Cited

U.S. PATENT DOCUMENTS

| | | | | |
|---|---|---|---|---|
| 5,458,351 | A * | 10/1995 | Yu | 280/87.042 |
| 6,182,985 | B1 * | 2/2001 | Wang et al. | 280/87.041 |
| 6,557,863 | B2 * | 5/2003 | Chen | 280/11.208 |
| 6,840,524 | B2 * | 1/2005 | Yu | 280/87.041 |
| 7,338,056 | B2 * | 3/2008 | Chen et al. | 280/87.042 |
| D572,332 | S * | 7/2008 | Sramek et al. | D21/765 |
| 7,600,768 | B2 * | 10/2009 | Chen et al. | 280/87.042 |

* cited by examiner

*Primary Examiner* — John Walters

(57) ABSTRACT

A twistable connecting structure for linking two wheeled assemblies (such as foot platforms) of a personal transportation device. This connecting structure has flexible elongated members linking the wheeled assemblies, and rigid support members bridging the gap between the elongated members. This configuration enables the connecting structure to twist without bending.

4 Claims, 3 Drawing Sheets

TORSIONALLY FLEXIBLE CONNECTING STRUCTURE FOR TRANSPORTATION DEVICE

BACKGROUND OF THE INVENTION

This invention relates to land vehicles having tiltable segments, such as those steerable by a tiltable platform or platforms. In particular, it relates to personal transportation devices having wheeled assemblies linked by a connecting structure wherein the wheeled assemblies are independently tiltable.

In existing personal transportation devices having two wheeled assemblies linked by a connecting structure, independent tilting of the wheeled assemblies is achieved by pivoting of part of the connecting structure. An example of this is the connecting element (a "twist-pipe" in some embodiments) of the skateboard disclosed in U.S. Pat. No. 7,195,259. Twisting of the twist-pipe is possible because two or more pipe sections are pivotably coupled end-to-end. This method allows for effective twisting, but it necessarily involves moving contact between various parts, and these parts could wear out with use.

A need therefore exists for a connecting structure that can serve a function similar to that of the connecting element described in the '259 patent, while avoiding fricative contact between its constituent parts. Such a connecting structure would not only be less prone to wearing out, but could also be manufactured more simply and at lower cost.

DETAILED DESCRIPTION OF THE INVENTION

Figure 1:
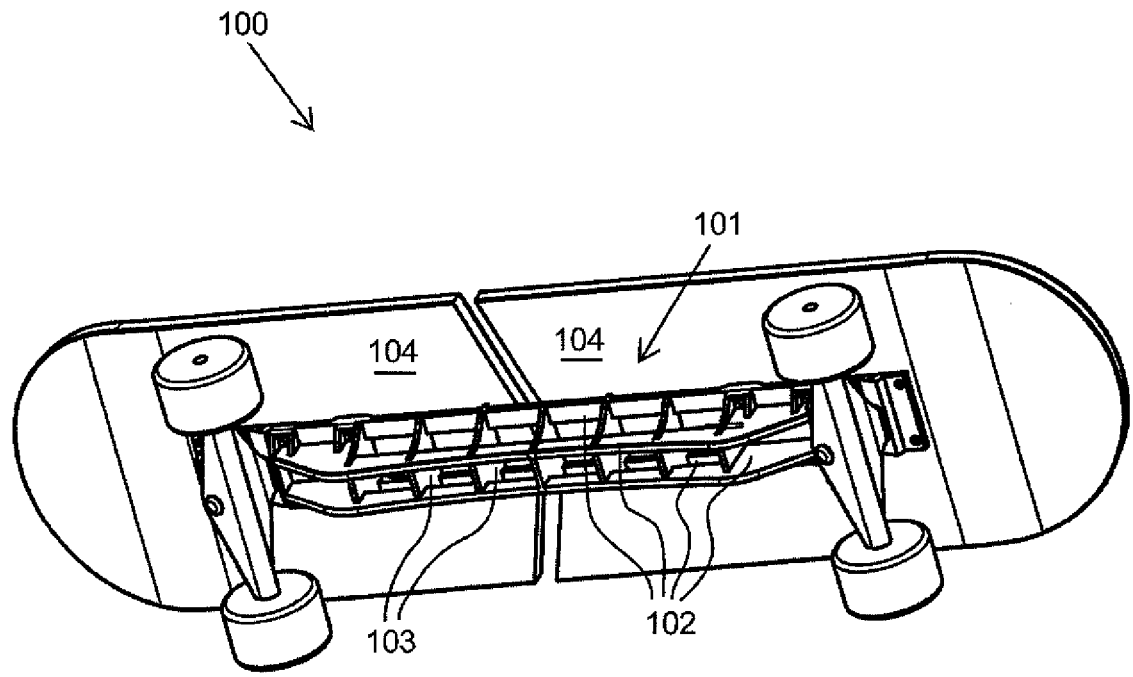
FIG. 1 is a perspective view of an embodiment of a personal transportation device comprising a torsionally flexible connecting structure in accordance with the present invention.

Referring to FIG. 1, a perspective view of one embodiment of a personal transportation device 100 comprising two wheeled assemblies (in this case foot platforms) 104 linked by a torsionally flexible connecting structure 101 in accordance with the present invention is shown. Connecting structure 101 comprises four elongated members 102 in an arrangement whose transverse cross-section is a trapezoid. Connecting structure 101 further comprises at least one support member 103. (Preferably, there are several support members 103.) Elongated members 102 are substantially parallel to each other. Elongated members 102 are furthermore flexible, the degree of flexibility depending on their thickness and on the material used. Support member(s) 103 are substantially perpendicular to elongated members 102, rigidly connect elongated members 102 to each other, and are sufficiently thin at the points of connection such that elongated members 102 may be separate from each other throughout the large majority of their length. If more than one support member 103 are used, it is preferable, but not necessary, to space them at substantially equal intervals along the length of elongated members 102.

Connecting structure 101 cannot substantially bend because bending of connecting structure 101 would require elongated members 102 to move closer together, which is substantially prevented by support member(s) 103. However, connecting structure 101 does allow for torsional movement. When twisting force is applied to connecting structure 101, each individual elongated member 102 bends into a helical shape, resulting in twisting of connecting structure 101. Elongated members 102, being elastically flexible, resist bending, and tend to straighten; connecting structure 101 is therefore inherently biased toward a non-twisted shape. The twisting capability of connecting structure 101 allows the foot platforms 104 of transportation device 100 to be tilted relative to each other, enabling turning as well as propulsion. (Propulsion can be achieved by means such as oscillatory motion of the feet, particularly if the wheels are inclined-axle casters.).

Figure 2:
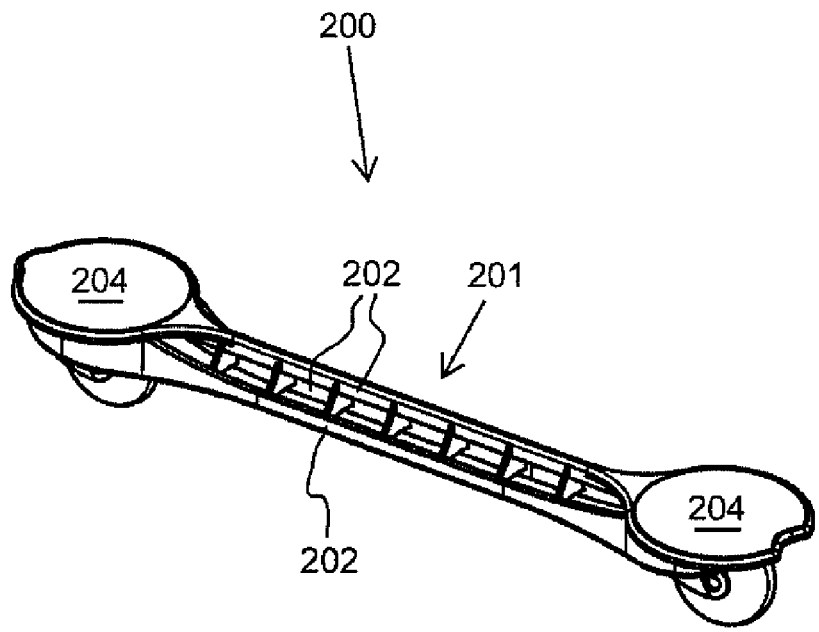
FIG. 2 is a perspective view of an embodiment of a personal transportation device comprising a torsionally flexible connecting structure wherein the connecting structure and the foot platforms are made from the same piece of material, in accordance with the present invention
Figure 3:
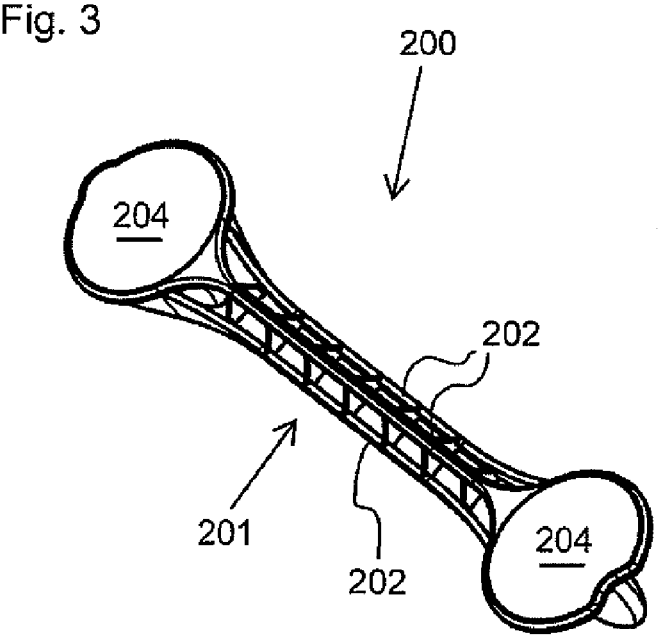
FIG. 3 is another perspective view of the personal transportation device of FIG. 2.

Referring to FIGS. 2 and 3, perspective views of another embodiment of a personal transportation device 200 are shown. Personal transportation device 200 comprises two wheeled assemblies (foot platforms) 204 linked by torsionally flexible connecting structure 201, wherein said foot platforms 204 and connecting structure 201 are made from a single piece of material. This differs from personal transportation device 100 of FIG. 1 in that it is simpler to manufacture; the configuration and function of the connecting structure are the same. Whereas FIGS. 1 and 4 show embodiments having torsionally flexible connecting structures 101 and 401 each having four elongated members 102 and 402, connecting structure 201 in FIGS. 2 and 3 has three elongated members 202 in an arrangement whose transverse cross-section is a triangle.

Figure 4:
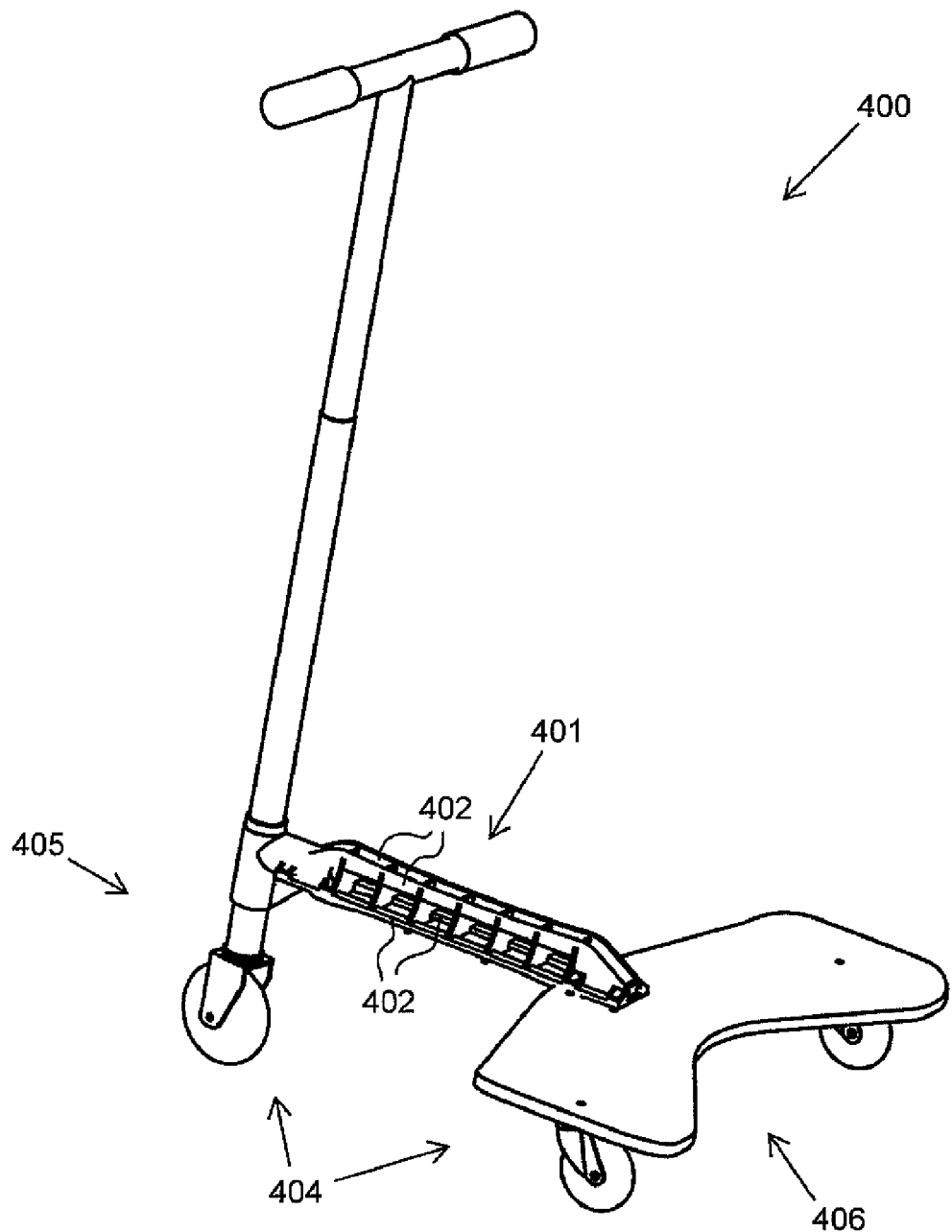
FIG. 4 is a perspective view of another embodiment of a personal transportation device comprising a torsionally flexible connecting structure in accordance with the present invention.

Referring to FIG. 4, a perspective view of one embodiment of a personal transportation device 400 comprising two wheeled assemblies 404 linked by a torsionally flexible connecting structure 401 in accordance with the present invention is shown. Connecting structure 401 comprises four elongated members 402, in an arrangement whose transverse cross-section is a trapezoid. In this embodiment the first wheeled assembly 405 is associated with the front wheel of personal transportation device 400, and the second wheeled assembly 406 is associated with the two rear wheels. Connecting structure 401 allows the first wheeled assembly 405 to be tilted independently of the second wheel assembly 406, thus providing, among other benefits, the ability to lean during turns for greater stability.

The invention claimed is:

1. A connecting structure for linking two wheeled assemblies in a personal transportation device, comprising:
    at least three elongated members substantially parallel to each other, each of said elongated members being individually flexible throughout its entire length;
    at least one support member rigidly connecting said elongated members together and substantially perpendicular to said elongated members;
wherein said at least three elongated members are arranged such that they do not substantially share a common geometric plane; and
wherein said at least three elongated members are unconnected throughout a large majority of their length.

2. The connecting structure of claim 1, wherein said connecting structure and said wheeled assemblies are made from a single piece of material.

3. The connecting structure of claim 1, wherein each of said wheeled assemblies is supported by at least one wheel.

4. The connecting structure of claim 1, wherein each of said wheeled assemblies is supported by at least one caster.

* * * * *